US011463902B2

(12) United States Patent
Cheng et al.

(10) Patent No.: US 11,463,902 B2
(45) Date of Patent: Oct. 4, 2022

(54) QUALITY OF SERVICE FLOW MAPPING HANDLING FOR THE SUPPORT OF V2X COMMUNICATION

(71) Applicant: QUALCOMM INCORPORATED, San Diego, CA (US)

(72) Inventors: Hong Cheng, Basking Ridge, NJ (US); Sudhir Kumar Baghel, Hillsborough, NJ (US); Dan Vassilovski, Del Mar, CA (US); Kapil Gulati, Montgomery, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/948,840

(22) Filed: Oct. 1, 2020

(65) Prior Publication Data

US 2021/0105655 A1    Apr. 8, 2021

Related U.S. Application Data

(60) Provisional application No. 62/910,299, filed on Oct. 3, 2019.

(51) Int. Cl.
*H04W 28/02* (2009.01)
*H04W 4/40* (2018.01)
*H04W 76/11* (2018.01)

(52) U.S. Cl.
CPC ........ *H04W 28/0268* (2013.01); *H04W 4/40* (2018.02); *H04W 76/11* (2018.02)

(58) Field of Classification Search
CPC ... H04W 28/0268; H04W 76/11; H04W 4/40; H04W 8/26; H04W 29/12009; H04W 4/42; H04W 4/44; H04W 4/46; H04W 4/48
See application file for complete search history.

(56) References Cited

U.S. PATENT DOCUMENTS

2018/0132304 A1* 5/2018 Lee ...................... H04W 76/38
2018/0324633 A1* 11/2018 Lee ................... H04W 28/0268
(Continued)

FOREIGN PATENT DOCUMENTS

WO    WO-2020207737 A1 * 10/2020 ........... H04L 1/1867

OTHER PUBLICATIONS

CATT: "PC5 MAC PDU Construction", 3GPP Draft, R2-1908748, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 16, 2019 (Aug. 16, 2019), XP051766570, 6 Pages, Retrieved from the Internet: URL: http://www.3gpp.org/ftp/tsg_ran/WG2_RL2/TSGR2_107/Docs/R2-1908748.zip. [retrieved on Aug. 16, 2019] the whole document.
(Continued)

*Primary Examiner* — Mewale A Ambaye
(74) *Attorney, Agent, or Firm* — Haynes and Boone, LLP

(57) ABSTRACT

Wireless communication systems and methods related to quality of service mapping, are provided. A first user equipment determines a sidelink radio bearer identifier (SLRB ID) for a quality of service (QoS) flow from a plurality of rules. The rules identify different characteristics of the QoS flow. The SLRB ID is inserted into a header of a packet in the QoS flow. The QoS flow is mapped to a radio bearer that is mapped to an L2 link with other radio bearers that are mapped to other QoS flows. The L2 link transmits the radio bearers to a second UE as part of a broadcast, groupcast or unicast sidelink communication. Based on the SLRB ID, the second UE identifies requirements of the QoS flow.

31 Claims, 8 Drawing Sheets

(56) References Cited

U.S. PATENT DOCUMENTS

| | | | |
|---|---|---|---|
| 2019/0037461 A1* | 1/2019 | Li | H04W 36/24 |
| 2019/0215685 A1* | 7/2019 | Wang | H04W 8/22 |
| 2019/0239112 A1* | 8/2019 | Rao | H04W 28/06 |
| 2019/0289492 A1* | 9/2019 | Hampel | H04W 28/0263 |

OTHER PUBLICATIONS

Huawei, et al., "TP to TR 38.885 on QoS Support for NR V2X", 3GPP Draft, R2-1900371, TP to TR 38.885 on QOS Support for NR V2X, 3rd Generation Partnership Project (3GPP), Mobile Competence Centre, 650, Route Des Lucioies, F-06921 Sophia-Antipolis Cedex, France, vol. RAN WG2, No. Athens, Greece, Feb. 25, 2019-Mar. 1, 2019, Feb. 15, 2019 (Feb. 15, 2019), XP051601767, 8 Pages, Retrieved from the Internet: URL: http://www.3gpp.org/ftp/tsg%5Fran/WG2%5FRL2/TSGR2%5F105/Docs/R2%2D1900371%2Ezip. (retrieved on Feb. 15, 2019) sections 5.1, 7.

International Search Report and Written Opinion—PCT/US2020/053879—ISA/EPO—dated Dec. 9, 2020.

* cited by examiner

| SLRB ID 1 | Rule 1 |
|---|---|
| SLRB ID 2 | Rule 2 |
| SLRB ID 3 | Rule 3 |
| SLRB ID 4 | Rule 4 |
| SLRB ID 5 | Rule 5 |
| SLRB ID 6 | Rule 6 |

QUALITY OF SERVICE FLOW MAPPING HANDLING FOR THE SUPPORT OF V2X COMMUNICATION

CROSS REFERENCE TO RELATED APPLICATION

The present application claims priority to and benefit of the U.S. Provisional Patent Application No. 62/910,299, filed Oct. 3, 2019, which is hereby incorporated by reference in its entirety.

TECHNICAL FIELD

This application relates to wireless communication systems, and more particularly to a quality of service flow mapping for supporting vehicle to everything communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology, such as ultra-reliability, low-latency, and fast recovery.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an example, a method of wireless communication, comprises determining, at a first user equipment (UE), a sidelink radio bearer identifier (SLRB ID) for a quality of service (QoS) flow using a plurality of rules that map to a plurality of SLRB IDs, inserting the determined SLRB ID into a header of a packet of the QoS flow, identifying a radio bearer using the SLRB ID, wherein the radio bearer carries the packet of the QoS flow; mapping the radio bearer to an L2 link, and communicating the packet of the radio bearer in the L2 link to at least one second UE with at least one other packet from at least one other radio bearer that has a different SLRB ID that corresponds to a different QoS flow.

In a further example, the first UE and the at least one second UE are pre-configured with the plurality of rules.

In a further example, the first UE and the at least one second UE receive the plurality of rules from a base station using a base station signal.

In a further example, the first UE and the at least one second UE receive the plurality of rules from a base station using dedicated broadcast signaling.

In a further example, the communicating is over a vehicle-to-everything (V2X) communication connection.

In a further example, a rule in the plurality of rules maps at least one characteristic of the QoS flow.

In a further example, the characteristic is a range between a first UE and the at least one second UE.

In a further example, the communicating is a groupcast transmission in a V2X communication connection to the at least one second UE that is in a group with the first UE that is proximate to the first UE.

In a further example, the communicating is a broadcast transmission in a V2X communication connection to the at least one second UE that is proximate to the first UE.

In a further example, the inserting further comprises inserting the SLRB ID into a sidelink control information (SCI) in the header of the packet.

In yet another example, a method of wireless communication, receiving, at a fist user equipment (UE) from a second UE, at least one radio bearer in an L2 link that is configured to carry packets from multiple radio bearers that correspond to QoS flows having different characteristics, identifying a packet from the at least one radio bearer, identifying a sidelink radio bearer identifier (SLRB ID) from a header in the packet, identifying a rule from a plurality of rules that maps to the SLRB ID, wherein the rule includes at least one characteristic of a QoS flow associated with the packet, and determining an action at the first UE based on the at least one characteristic in the rule.

In a further example, the action causes the first UE to issue a retransmission request to the second UE.

In a further example, the receiving using the at least one radio bearer in the L2 link is a groupcast transmission from the second UE.

In a further example, the receiving using the at least one radio bearer in the L2 link is a broadcast transmission from the second UE.

In a further example, the at least one characteristic is a range between the first UE and the second UE.

In a further example, the first UE and the second UE are pre-configured with the plurality of rules.

In a further example, the first UE and the second UE receive the plurality of rules from a base station using a base station broadcast signal.

In a further example, the first UE and the second UE receive the plurality of rules from a base station using dedicated broadcast signaling.

In a further example, the receiving is over a vehicle-to-everything (V2X) communication connection.

In a further example, the identifying the SLRB ID from the header of the packet further comprises identifying the SLRB ID from a SCI in the header.

DETAILED DESCRIPTION

Figure 1:
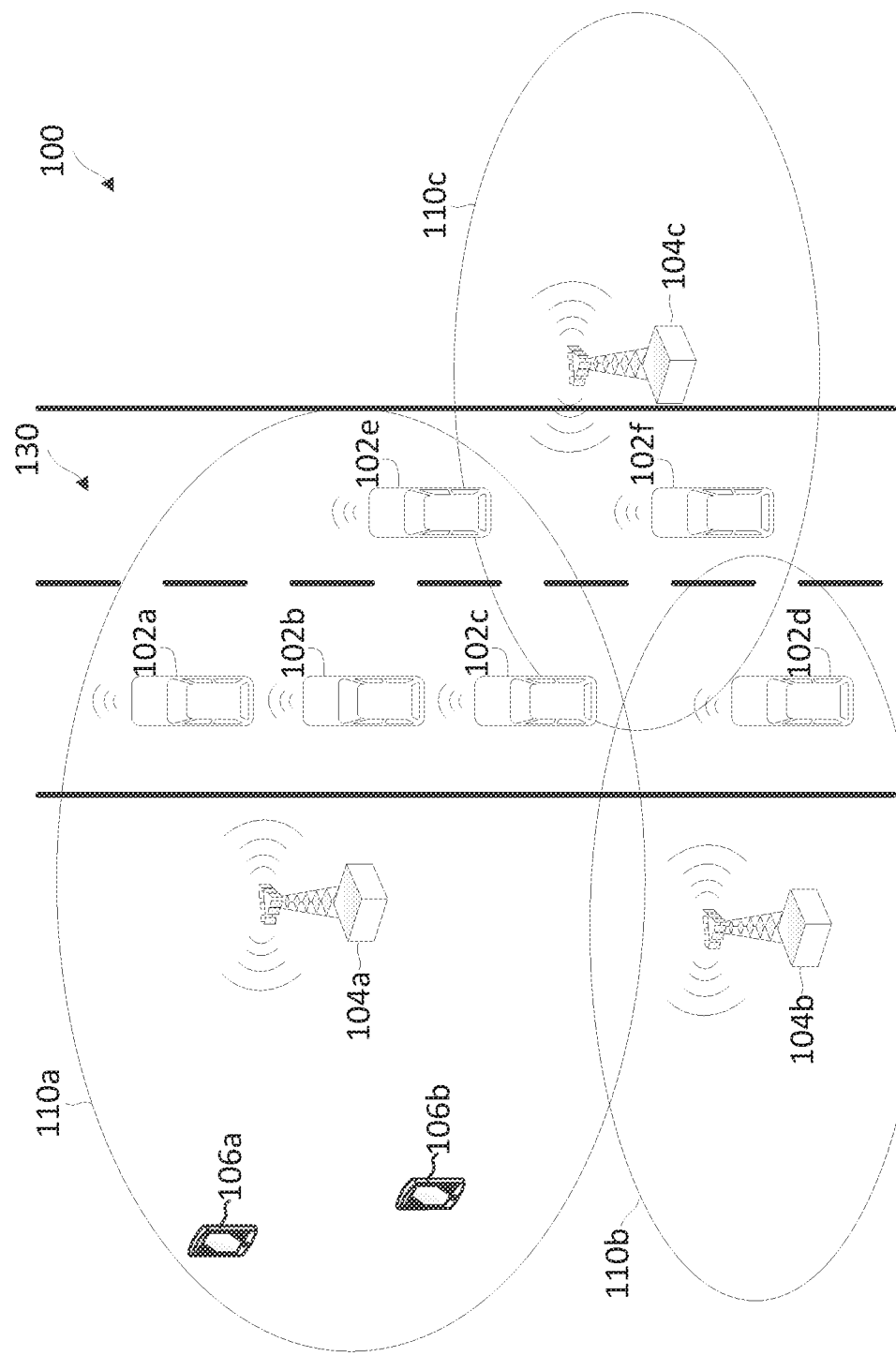
FIGS. 1 and 2 illustrate a wireless communication network, according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may employ various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

Aspects of the disclosure describe a V2X communication system where multiple user equipment (UEs) communicate over sidelinks. A first user equipment (UE) determines a sidelink radio bearer identifier (SLRB ID) for a quality of service (QoS) flow using a table of rules that map to a plurality of SLRB IDs. The SLRB ID is inserted into a header of a packet in the QoS flow or the SCI in the header. The QoS flow is mapped to a radio bearer. The radio beater is mapped to an L2 link in V2X communication with other radio bearers and their QoS flows. The L2 link communicates radio bearers to at least one second UE in a broadcast, groupcast, or unicast transmission.

Aspects of the disclosure describe how a second UE identifies characteristics of the QoS flow and uses the characteristics to determine whether to generate an action, such as transmission of a HARQ NACK to the first UE. The second UE receives at least one radio bearer in an L2 link from a first UE in a broadcast, groupcast, or unicast transmission. The second UE identifies a packet from the at least one radio bearer in the L2 link. From the header or the SCI in the header of the packet, the second UE identifies a SLRB ID. From the SLRB ID, the second UE identifies a rule, and from the rule the UE identifies characteristics associated with the QoS flow that includes the packet. The second UE determines an action that transmits a communication to the first UE based on the characteristics.

FIG. 1 illustrates a wireless communication network 100 that facilitates vehicle-to-everything communications (V2X) according to embodiments of the present disclosure. Example V2X communications may be vehicle-to-vehicle (V2V) communication, vehicle-to-pedestrian (V2P) communication, vehicle-to-infrastructure (V2I) communication and vehicle-to-network (V2N) communication.

The network 100 may include a number of vehicles 102 (e.g., shown as 102a to 102f) and a number of BSs 104. The BSs 104 may include an Evolve Node B (eNodeB) or a next Generation Node B (gNB). A BS 104 may be a station that communicates with the vehicles 102 and may also be referred to as a base transceiver station, a node B, an access point, and the like.

The BSs 104 communicate with the vehicles 102. A vehicle 102 may communicate with the BS 104 via an uplink (UL) and a downlink (DL). The downlink (or forward link) refers to the communication link from the BS 104 to the vehicle 102. The UL (or reverse link) refers to the communication link from the vehicle 102 to the BS 104. The BSs 104 may also communicate with one another, directly or indirectly, over wired and/or wireless connections.

The vehicles 102 may be travelling on a roadway 130. The vehicles 102 may travel through different coverage areas or cells 110 in the network 100. The vehicles 102 may have in-vehicle wireless communication devices for communicating with each other over sidelinks and with the BSs 104. The vehicles 102 may have receivers for communication with a global navigation satellite system (GNSS), which may provide location tracking and timing information. The vehicles 102 may have sensors for various sensing, which may be for navigational, safety, and/or performance. Some examples of sensors may include Lidars, radars, and high-definition cameras. The network 100 is one example of a network to which various aspects of the disclosure apply.

Each BS 104 may provide communication coverage for a particular geographic area. In 3GPP, the term "cell" can refer to this particular geographic coverage area of a BS and/or a BS subsystem serving the coverage area, depending on the context in which the term is used. In this regard, a BS 104 may provide communication coverage for a macro cell, a pico cell, a femto cell, and/or other types of cell with varying coverage areas and access restrictions. As shown, the BSs 104a, 104b, and 104c provide communication coverage in the cells 110a, 110b, and 110c, respectively. In some embodiments, a BS 104 may support one or multiple (e.g., two, three, four, and the like) cells.

The network 100 may support synchronous or asynchronous operation. For synchronous operation, the BSs 104 may have similar frame timing, and transmissions from different BSs 104 may be approximately aligned in time. For asynchronous operation, the BSs 104 may have different frame timing, and transmissions from different BSs 104 may not be aligned in time.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

In some aspects, communications in the network 100 may be performed in the form of radio frames. A radio frame may include a plurality of subframes. Each subframe may include a plurality of symbols spanning a frequency band and a time interval. The network 100 may employ various transmission configurations. For example, each radio frame may include one or more subframes for DL transmissions and one or more subframes for UL transmissions.

In the network 100, the vehicles 102 may employ various wireless communication technologies. In some embodiments, the network 100 may support LTE-based V2X, V2V, LTE-based V2I, LTE-based device-to-device (D2D), or direct short-range communication (DSRC) communications.

Network 100 may further include a number of user equipments (UEs) 106a, 106b in communication with the BSs 104 and in sidelink communication with each other or with vehicles 102. A UE may be a cellular phone, a smartphone, a personal digital assistant, a wireless modem, a laptop computer, a tablet computer, etc. In some embodiments, the UEs and the vehicles 102 may employ a similar initial attachment procedure to communicate initiate communication with the BSs 104. For example, the initial attachment procedure may be similar to the LTE random access procedure.

Figure 2:
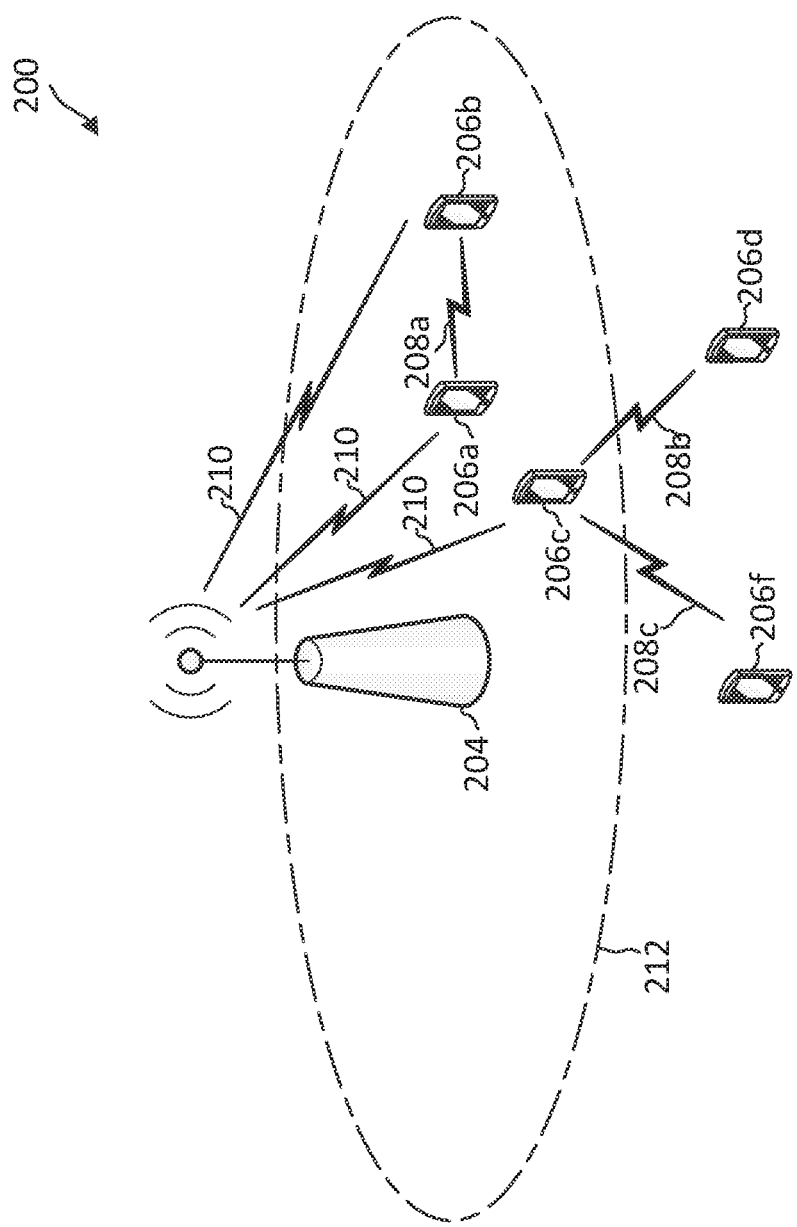

FIG. 2 illustrates an example of a wireless communication network 200 that provisions for sidelink communications according to embodiments of the present disclosure. Although shown using UEs, the embodiments may also apply to vehicle 102a-102f in FIG. 1. FIG. 2 illustrates one BS 204 and four UEs 206 for purposes of simplicity of discussion, though it will be recognized that embodiments of the present disclosure may scale to any suitable number of UEs 206 and/or BSs 204 (e.g., the about 2, 3, 6, 7, 8, or more).

In the network 200, some of the UEs 206 may communicate with each other in peer-to-peer communications. For example, the UE 206a may communicate with the UE 206b over a sidelink 208a, and the UE 206c may communicate with the UE 206d over another sidelink 208b. In some instances, the sidelinks 208a may be unicast bidirectional links between a pair of UEs 206a and 206b. In some other instances, the sidelinks 208b and 208c can be broadcast and groupcast links supporting multicast sidelink services among the UEs 206c, 206f, and 206d. In broadcast transmission, UE 206c may transmit to all UEs 206, while in a groupcast transmission, UE 206c may transmit to members of the group. Some of the UEs 206 may also communicate with the BS 204 in a UL direction and/or a DL direction via communication links 210. For instance, the UE 206a, 206b, and 206c are within a coverage area 212 of the BS 204, and thus may be in communication with the BS 204. The UEs 206d and 206f are outside the coverage area 212, and thus may not be in direct communication with the BS 204. In some instances, the UE 206c may operate as a relay for the UE 206d to reach the BS 204. In some aspects, some of the UEs 206 are associated with vehicles (as shown in FIG. 1) and the communications over the sidelinks 208a-108c may be C-V2X communications. C-V2X communications may refer to communications between vehicles and any other wireless communication devices in a cellular network.

In some aspects, the BS 204 may communicate with a UE 206a using HARQ techniques to improve communication reliability. The BS 204 may schedule UE 206a for a PDSCH communication by transmitting a DL grant in a PDCCH. The BS 204 may transmit a DL data packet to the UE 206a according to the schedule in the PDSCH. The DL data packet may be transmitted in the form of a transport block (TB). If the UE 206a receives the DL data packet successfully, the UE 206a may transmit a HARQ ACK to the BS 204. Conversely, if the UE 206a fails to receive the DL transmission successfully, the UE 206a may transmit a HARQ NACK to the BS 204. Upon receiving a HARQ NACK from the UE 206a, the BS 204 may retransmit the DL data packet to the UE 206a. The retransmission may include the same coded version of DL data as the initial transmission. Alternatively, the retransmission may include a different coded version of the DL data than the initial transmission. The UE 206*a* may apply soft-combining to combine the encoded data received from the initial transmission and the retransmission for decoding. The BS 204 and the UE 206*a* may also apply HARQ for UL communications using substantially similar mechanisms as the DL HARQ. Similarly, UE 206*s* may also apply similar HARDQ for sidelink communications with each other (as also vehicles 102 discussed in FIG. 1).

As discussed above, networks 100, 200 may be used for sidelink communications, including device-to-device (D2D) communications, vehicle-to-everything (V2X) communication, vehicle-to-vehicle (V2V) communication, vehicle-to-pedestrian (V2P) communication, vehicle-to-infrastructure (V2I) communication and vehicle-to-network (V2N) communication. Notably, vehicles 102 may also be included in network 200 (not shown) and communicate with UEs 206 over sidelinks. Although the embodiments described below are describe sidelink communication using a V2X model, the embodiments may also apply to other types of sidelink communication.

Figure 3:
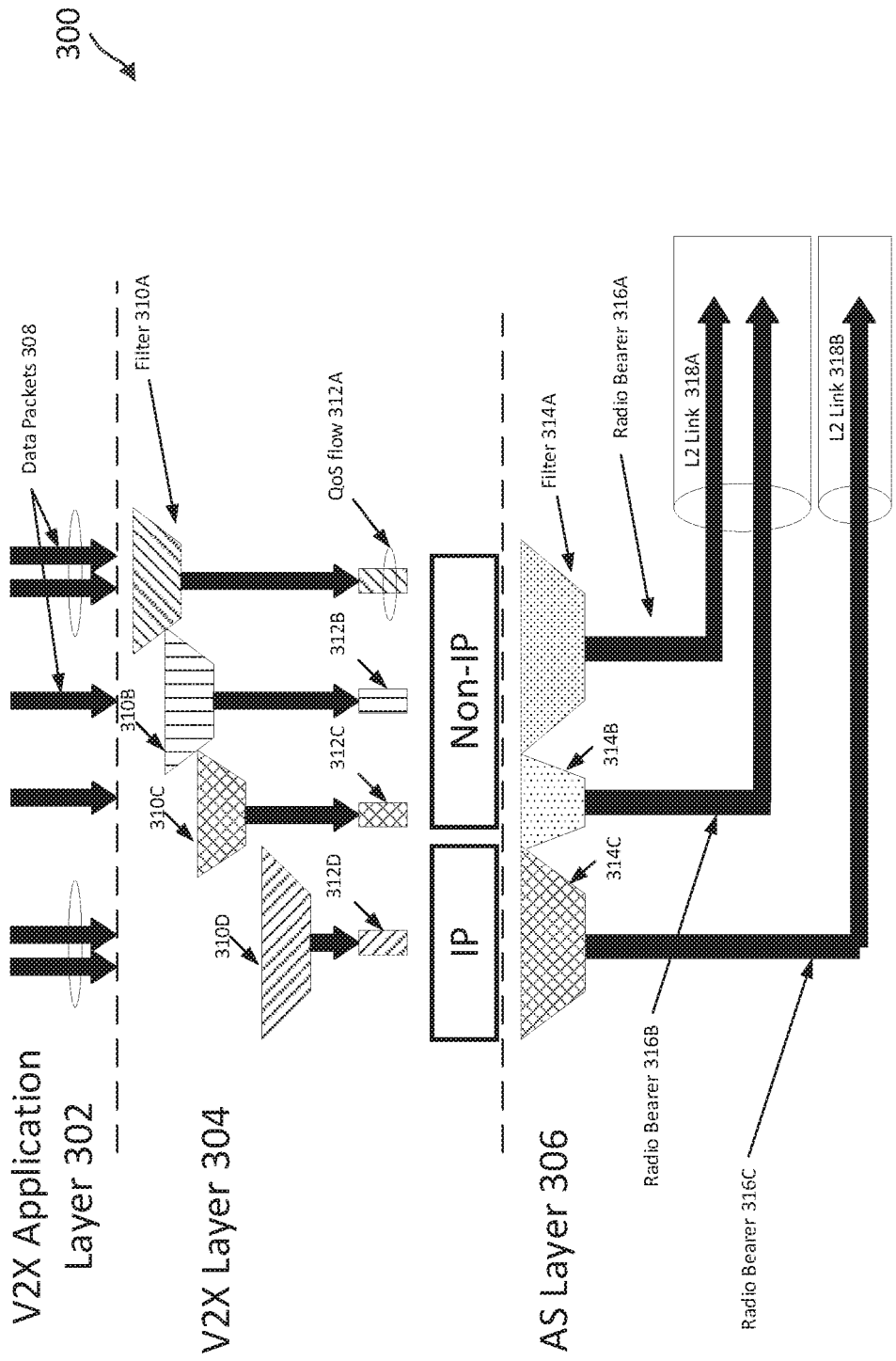
FIG. 3 illustrates layers of a V2X communication model, according to embodiments of the present disclosure.

FIG. 3 is a block diagram of a V2X communication module 300 according to the embodiments of the disclosure. V2X communication module 300 may be implemented by vehicle 102 or UE 206 (collectively referred to as UE 206). As illustrated in FIG. 3, V2X communication module 300 includes a V2X application layer 302, a V2X layer 304, and an AS layer 306. V2X application layer 302 may receive data packets 308 from various applications that execute on UE 206 and pass packets 308 to V2X layer 304 for eventual transmission to other UEs 206.

In some aspects, V2X layer 304 may classify packets 308 using filters 310A-310D. Filters 310A-310D may include rules for classifying packets 308 into QoS flows 312A-312D. For example, packets 308 may include a service type field, e.g. PSID or ITS-AID, and filters 310A-312D may use the service type field to classify packets 308 into one of QoS flows 312A-312D. QoS flows 312A-312D may have different levels of service with some QoS flows having faster delivery than other QoS flows. In another example, packets 308 may include a destination field and filters 310A-312D may use a destination field to classify packets 308 into QoS flows 312A-312D. In another example, packets 308 may include a group field for groupcast transmissions and filters 310A-310D may use the group field to classify packets 308 into QoS flows 312A-D. In yet another example, filters 310A-310D may be associated with a range between transmitting and receiving UEs 206. For example, suppose UE 206*a* wants to communicate with UE 206*b* that is within a particular range. Accordingly, V2X layer 304 may classify packets 308 from UE 206*a* to UE 206*b* into QoS flow 312A using filters 310B that can transmit packets 308 within the range.

In some aspects, AS layer 306 may receive QoS flows 312A-312D from V2X layer 304. AS layer 306 may include filters 314A-C that may map QoS flows 312A-312D to radio bearers 316A-C. For simplicity, suppose AS layer 306 maps QoS flows 312A-312B to radio bearer 316A, QoS flow 312C to radio bearer 316B, and QoS flow 312D to radio bearer 316C. Radio bearers 316A-316C may transmit packets 308 in QoS flows 312A-D to one or more destinations, such receiving UEs 206. Radio bearers 316A-C that transmit packets 308 between UEs 206 are called sidelink radio bearers. In some aspects, AS layer 306 may map QoS flows 312A-312D to radio bearers 316A-C based on radio bearer mapping. The radio bearer mappings may be pre-configured in UE 206 and are stored in the mobile equipment (ME) or universal integrated circuit card (UICC). The mapping may also be pre-configured using provisioning via upper layer protocols. In another aspect, UE 206 may receive radio bearer mappings over a network 100, 200 via a base station broadcast e.g. system information blocks ("SIB") when UE 206 is in idle or an inactive mode. UE 206 may also receive the radio bearer mappings from a base station via network 100, 200, using dedicated radio resource control (RRC) signaling e.g. when UE 206 is in a connected mode.

In some embodiments, AS layer 306 may further aggregate radio bearers 316A-316C into L2 links 318A-318B. L2 links 318A-318B may be identified by a source and a destination, which may be an L2 ID pair. Because L2 links 318A-318B are identified by source and destination, AS layer 306 may map different radio bearers 316A-316C into L2 links 318A-318B according to source and destination. As illustrated in FIG. 3, AS layer 306 may map radio bearers 316A and 316B into L2 link 318A because radio bearers 316A and 316B have the same source and destination, and AS layer 306 may map radio bearer 316C into L2 link 318B that has a different source and destination from radio bearers 316A-316B. In another example, suppose radio bearers 316A and 316B are part of a broadcast transmission, then AS layer 306 may map radio bearers 316A and 316B to L2 link 318A that transmits radio bearers 316A and 316B to all UEs 206. In another example, if radio bearers 316A and 316B are part of the groupcast transmission, AS layer 306 may map radio bearers 316A and 316B to L2 link 318A that transmits radio bearers 316A and 316B to UEs 206 that are included in the groupcast. In yet another example, if radio bearers 315A and 315B are part of the unicast transmission, AS layer 306 may map radio bearers 316A and 316B to L2 link 318A that transmits radio bearers 316A and 316B to a receiving UE 206.

As illustrated above, radio bearers 316A and 316B may have different levels of QoS flows 312 in the same L2 link 318A. In this case, the receiving UEs 206 may not be able to derive the level of QoS flows 312A, 312B, and 312C from L2 link 318A. This may present a problem in V2X communications generally and particularly in group cast communications where UE 206 transmits packet 308 to other UEs 206 that are within a particular range from the transmitting UE 206. For example, UE 206*c* may transmit packets 308 to UEs 206*d* and 206*f* about an event, e.g. UE 206*c* that is a vehicle making a right turn. As discussed above, when UEs 206*d*, 206*f* receive packets 308, UEs 206*d*, 206*f* may transmit a HARQ ACK if the transmission is successful and a HARQ NACK if a transmission is not successful. Suppose UE 206*d* does not properly receive packets 308 and attempts to request a retransmission from UE 206*d* using HARD NACK. However, in V2X communication UE 206*d* may not be able to successfully request a retransmission from UE 206*c* by issuing HARQ NACK because UE 206*c* may not be within the range of UE 206*d*. Even if UE 206*d* does issue HARQ NACK, the request may be useless because the information, e.g. UE 206*c* making a right turn is irrelevant to UE 206*d* when UE 206*d* is not nearby but is one kilometer away.

In some embodiments, UE 206*c* make include a range control in QoS flows 312 so that UE 206*d* may issue HARQ NACK when UE 206*d* is within range of UE 206*c*. In this way, UE 206*d* would not needlessly request retransmissions and waste network resources.

As discussed above, different ranges may be associated with different QoS flows 312A-312D. For example, an intersection management service application may include packets 308 in QoS flow 312A of UE 206*c* that has a range where QoS flow 312A may reach UE 206*d*, 206*f* that are near the intersection. In another example, a highway service application may include packets 308 in QoS flow 312B of UE 206a that has a larger range where QoS flow 312B may reach UEs 206b, when UE 206b is far away. Thus, for different types of services there may be different ranges.

In some aspects, suppose receiving UE 206d may need to issue a HARQ NACK to request a retransmission of packets 308 that UE 206d received over L2 link 318A from UE 206c. However, UE 206d may need to know the range requirement to determine whether to issue HARQ NACK or whether the range between UE 206c and 206d is too large and issuing HARQ NACK would be useless. Suppose further that L2 link 318A includes radio bearer 316A, 316B, where radio bearer 316A includes QoS flow 312A and radio bearer 316B includes QoS flow 312B and QoS flow 312C. In this case, UE 206d may need to differentiate between radio bearers 316A, 316B to determine which of QoS flows 312A, 312B, 312C includes packets 308. This is because radio bearers 316A, 316B and the corresponding QoS flows 312A, 312B, 312C may have different range requirements. As such, if packet 308 belongs to QoS flows 312A that meets range requirement, UE 206d may issue HARQ NACK. On the other hand, if packet 308 belong to QoS flow 312B or 312C that does not meet the range requirements, UE 206d may not issue HARQ NACK.

To differentiate between QoS flows 312, UEs 206 may be preconfigured with sidelink radio barrier (SLRB) mapping rules. SLRB mapping rules may be configured on UE 206, stored within the SIM card of UE 206, or received by UE 206 using application layer signaling from BS 204 or another UE 206. In a non-limiting embodiment, the SLRB mapping rules may be stored in a table, a configuration file, etc., within UE 206.

Figure 4:
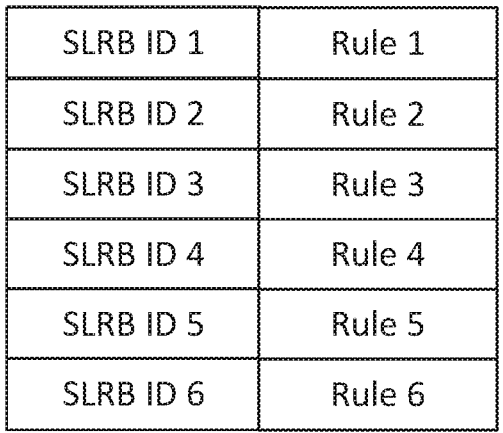
FIG. 4 is a block diagram of a sidelink radio bearer (SLRB) mapping table, according to the embodiments of the disclosure.

FIG. 4 is a block diagram of an SLRB mapping table 400, according to the embodiments of the disclosure. SLRB table 400 may include multiple SLRB identifiers or SLRB ID, such SLRB ID 1-SLRB ID 6. The SLRB IDs may be pre-assigned or may be added/deleted to/from SLRB table 400. The SLRB IDs may also be associated with radio bearers, one SLRB ID per radio bearer. For example, SLRB ID 1 may be associated with radio bearer 316A, and SLRB ID 2 may be associated with radio bearer 316B.

In some aspects, each SLRB ID may be associated with a rule for mapping QoS flows 312. Example rules in SLRB table 400 may be rules 1-6. The rules may include one or more characteristics or QoS requirements, such as packet delay budget (PDB), per error rates (PER), UE range, prevention quality indicators (PQI), priority, etc. Additionally, one of the rules may be a catch all rule that assigns SLRB ID to QoS flow 312 when QoS flow 312 does not fit the characteristics in other rules. Example rules may be:

SLRB ID=1 when QoS Flow is with PDB>25 ms, range falls between [100 m, 150 m], and priority level>3.
SLRB ID=2 when QoS Flow with PDB>50 ms, range falls between [150 m, 200 m], and priority level>5.
SLRB ID=3 when PQI=1, 2, and range in between [100 m, 150 m].

Notably, the format of SLRB table 400 is exemplary and is not limited by the format illustrated in FIG. 4 or above.

In some aspects, AS layer 306 may identify a rule from SLRB table 400 that fits the characteristics in QoS flow 312A and identify an SLRB ID that is associated with the rule. Suppose, SLRB table 400 identifies the rule that maps to SLRB ID 1. In this case, QoS flow 312A may be mapped to radio bearer 316A. UE 206c may then include the SLRB ID 1 in the header of packet 308 of QoS flow 312A. In some embodiments, the header of packet 308 may include sidelink control information. In this case, UE 206c transmitting packet 308 may include SLRB ID 1 in the sidelink control information (SCI) inside a control resource block that corresponds to the header of packet 308. AS layer 306 includes SLRB ID in the header or SCI because the receiving UE 206 may read the header or SCI without parsing the rest of packet 308.

In some aspects, UE 206c may use a similar process to map QoS flow 312B, 312C to radio bearer 316B. For example, AS layer 306 may identify a rule from SLRB table 400 that fits the characteristics of QoS flow 312B, 312C and identify SLRB ID 2 that is associated with the rule. Because, as discussed above SLRB ID 2 may be associated with radio bearer 316B, AS layer 306 may map QoS flow 312B, 312C to radio bearer 316B.

As discussed above, UE 206c transmits QoS flow 312A in radio bearer 316A together with radio bearer 316B in L2 link 318A to UE 206d. Once UE 206d receives L2 link 318A that includes packet 308, UE 206d may read the header of packet 308 or SCI and identify the SLRB ID. Using the SLRB ID, UE 206d can check SLRB table 400 for a rule that corresponds to the SLRB ID. Accordingly, if UE 206d identifies packet 308 with SLRB ID 1, UE 206d may identify that the range in the rule above as being between 100 m to 150 m. UE 206d may also determine the distance between UE 206c and 206d. If the distance between UE 206c and 206d is between 100 m and 150 m, UE 206d may issue a HARQ NACK to request a retransmission of QoS flow 312A. Otherwise, UE 206d does not. In another example, if UE 206d identifies packet 308 with SLRB ID 2, UE 206d may identify that the range in the rule above as being between 150 m to 200 m. In this case, if the distance between UE 206c and 206d is between 100 m and 150 m, UE 206d may not issue a HARQ NACK.

In some aspects, suppose UE 206c transmits QoS flow 312A in radio bearer 316A to UE 206d using a broadcast mode. Whether UE 206d issues a HARQ NACK in response to the message will depend on the characteristics of QoS flow 312A that are identified using SLRB ID 1. Similarly, suppose UE 206c transmits QoS flow 312A in radio bearer 316A to UE 206d using a groupcast mode. Whether UE 206d issues a HARQ NACK in response to the message will depend on the characteristics of QoS flow 312A that are identified using SLRB ID 1 and whether UE 206d is a member of the group. Further, suppose UE 206c transmits QoS flow 312A in radio bearer 316A to UE 206d using a unicast mode. Whether UE 206d issues a HARQ NACK in response to the message will depend on the characteristics of QoS flow 312A that are identified using SLRB ID 1 and whether UE 206d is the second party in the unicast communication.

With the rules in SLRB table 400, the UEs 206 receiving broadcast, groupcast, and unicast transmissions would consistently interpret the SLRB ID and the QoS requirements for QoS flows 312, even when multiple QoS flows 312 are mapped to the same radio bearer 316. The receiving UEs 206 may then determine whether to take an action based on the characteristics associated with QoS flow as described in a rule that corresponds to the SLRB ID.

In some aspects, a rule in SLRB table 400 may also indicate a type of HARQ feedback that may be used. For example, an Option 1 HARQ feedback may be a NACK with all UEs 206 in the group sending in the same physical side row feedback channel (PSFCH) resources, while an Option 2 HARQ feedback may be ACK with different UEs 206 using different PSFCH resources.

Figure 5:
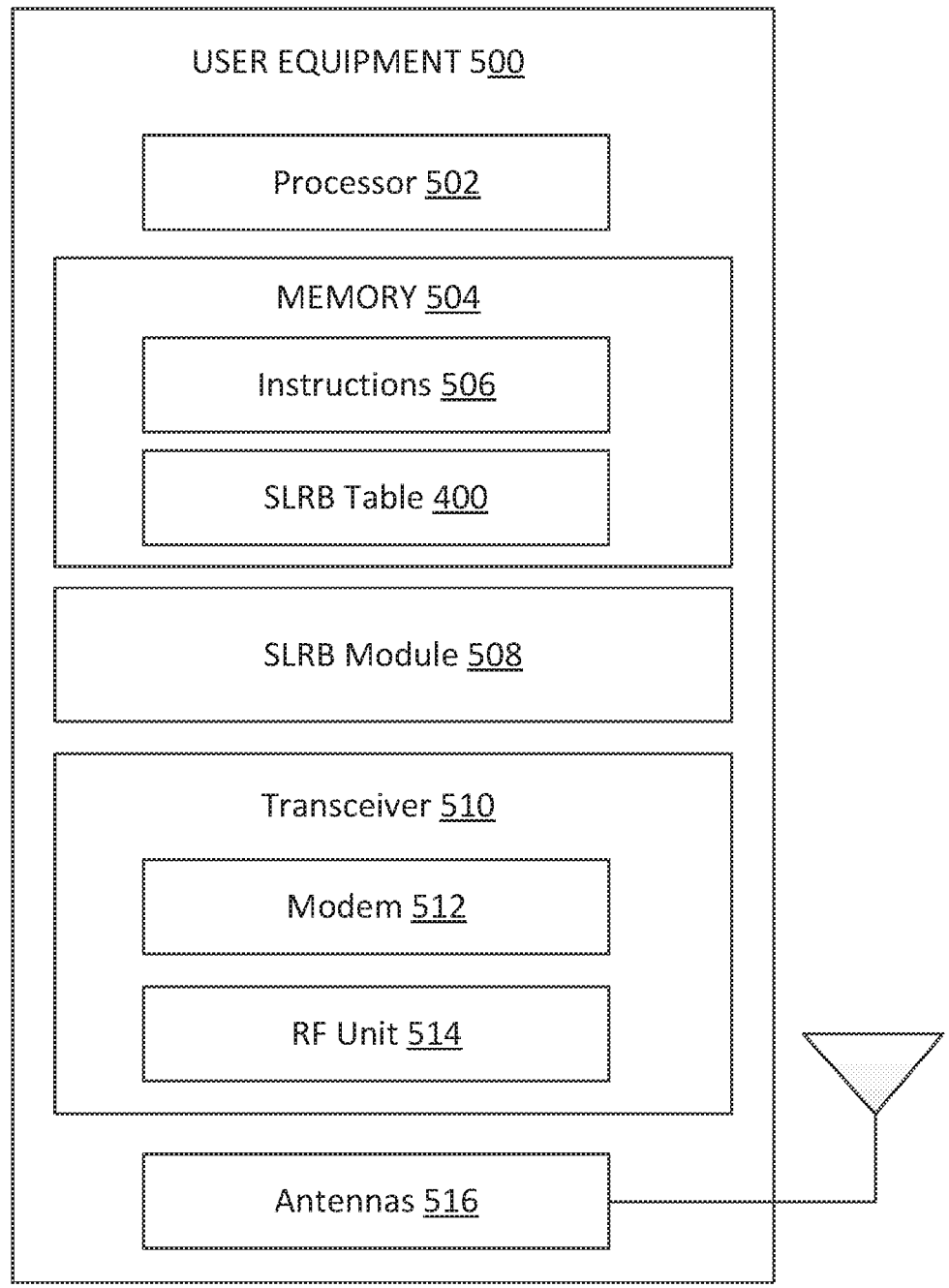
FIG. 5 is a block diagram of an exemplary user equipment (UE) according to embodiments of the present disclosure.

FIG. 5 is a block diagram of an exemplary UE 500 according to embodiments of the present disclosure. The UE 500 may be a UE 206 or vehicles 102 as discussed above. As shown, the UE 500 may include a processor 502, a memory 504, SLRB module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some aspects, the memory 504 includes a non-transitory computer-readable medium. The memory 504 may store instructions 506. The instructions 506 may include instructions that, when executed by the processor 502, cause the processor 502 to perform the operations described herein with reference to the UEs 500 in connection with embodiments of the present disclosure. Instructions 506 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements. Memory 504 may also store SLRB table 400 discussed in FIG. 4.

The SLRB module 508 may be used for various aspects of the disclosure. When UE 500 is preparing QoS flow 312 for transmission, SLRB module 508 is configured to use the rules in SLRB table 400 to identify SLRB ID for QoS flow 312 and include the SLRB ID into the SCI or header of packet 308 prior to transmitting packet 308. When UE 500 is receiving packet 308, SLRB module 508 is configured to use the SLRB ID in SCI or header of packet 308 to identify a corresponding rule that matches the requirements of QoS flow 312. As discussed above, the characteristics of QoS flow 312 may match one or more rules in the SLRB table 400.

As shown, the transceiver 510 may include the modem subsystem 512 and the RF unit 514. The transceiver 510 can be configured to communicate bi-directionally with other devices, such as the BSs 104, 204. The modem subsystem 512 may be configured to modulate and/or encode the data from the memory 504 and/or SLRB module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 206 or a BS 104, 204. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 206 to enable the UE 206 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of link switch indication and buffer status reports (BSRs) according to embodiments of the present disclosure. The antennas 516 may further receive data messages transmitted from other devices. The antennas 516 may provide the received data messages for processing and/or demodulation at the transceiver 510. The antennas 516 may include multiple antennas of similar or different designs in order to sustain multiple transmission links. The RF unit 514 may configure the antennas 516.

Figure 6:
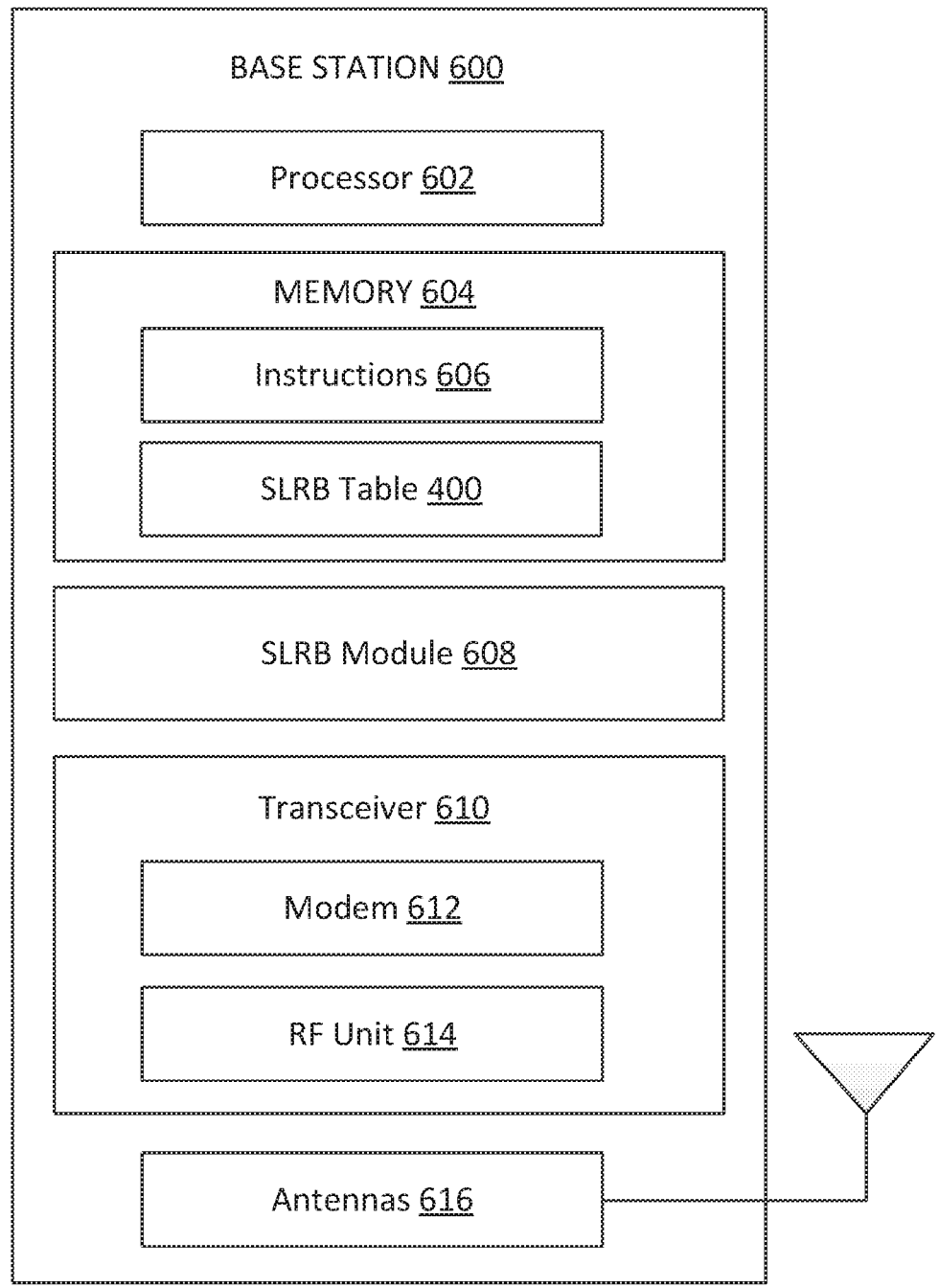
FIG. 6 is a block diagram of an exemplary base station (BS) according to embodiments of the present disclosure.

FIG. 6 is a block diagram of an exemplary BS 600 according to embodiments of the present disclosure. The BS 600 may be a BS 104, 204 as discussed above. A shown, the BS 600 may include a processor 602, a memory 604, SLRB module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein. Instructions 606 may also be referred to as code, which may be interpreted broadly to include any type of computer-readable statement(s) as discussed above with respect to FIG. 6. Memory 604 may also store SLRB table 400 discussed in FIG. 4.

The SLRB module 608 may be used for various aspects of the disclosure. BS 600 may use SLRB module 608 to select SLRB ID for UEs 206 to include in QoS flows 312. SLRB module 608 is configured to use the rules in SLRB table 400 to identify SLRB ID for QoS flow 312 and include the SLRB ID into the SCI for transmission to UE 206 or vehicle 102. Similarly, SLRB module 608 may also identify a rule for UE 206 or vehicle 102 using SLRB table 400 and SLRB ID. In some aspects, SLRB module 608 may also generate SLRB table 400 that has different rules that corresponds to different SLRB IDs and different characteristics of QoS flows 312.

As shown, the transceiver 610 may include the modem subsystem 612 and the RF unit 614. The transceiver 610 can be configured to communicate bi-directionally with other devices, such as the UEs 206 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 120. The RF unit 614 may be further configured to perform analog beamforming in conjunction with the digital beamforming. Although shown as integrated together in transceiver 610, the modem subsystem 612 and the RF unit 614 may be separate devices that are coupled together at the BS 104, 204 to enable the BS 104, 204 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 206 according to embodiments of the present disclosure. The antennas 616 may further receive data messages transmitted from other devices and provide the received data messages for processing and/or demodulation at the transceiver 610. The antennas 616 may include multiple antennas of similar or different designs in order to sustain multiple transmission links.

Figure 7:
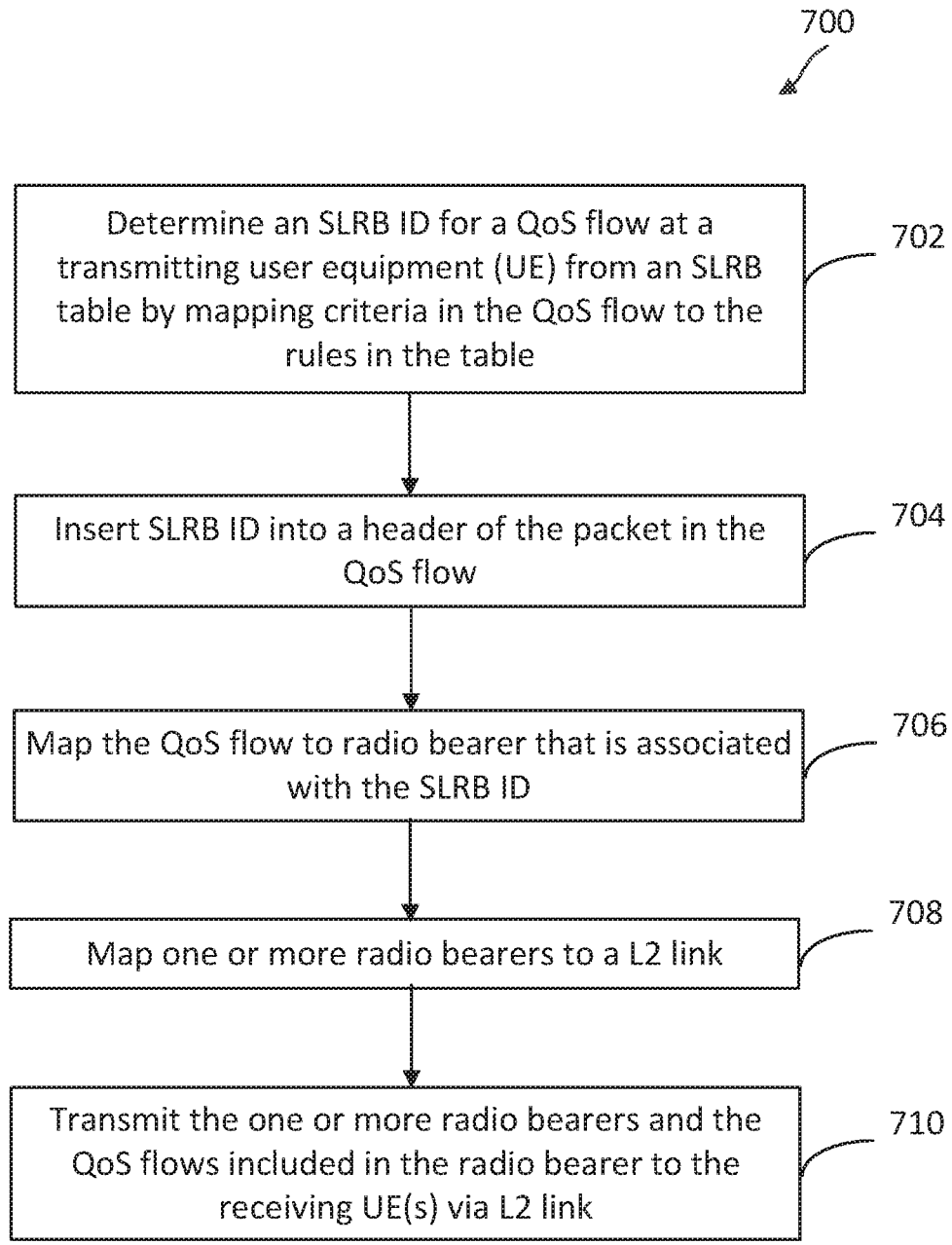
FIG. 7 is a flow diagram for mapping a QoS flow to a sidelink radio bearer identifier for sidelink communication, according to embodiments of the present disclosure.

FIG. 7 is a flow diagram of a method 700 according to some aspects of the present disclosure. Steps of the method 700 can be executed by a computing device (e.g., a processor, processing circuit, and/or other suitable component) of a wireless communication device or other suitable means for performing the steps. For example, a wireless communication device, such as the UE 206 or vehicles 102 may utilize one or more components, such as the processor 502, the memory 504, SLRB module 508, the transceiver 510, the modem 512, and the one or more antennas 516, to execute the steps of method 1100. As illustrated, the method 700 includes a number of enumerated steps, but aspects of the method 1100 may include additional steps before, after, and in between the enumerated steps. In some aspects, one or more of the enumerated steps may be omitted or performed in a different order.

At step 702, an SLRB ID for a QoS flow is selected. For example, SLRB module 508 of UE 206c that transmits QoS flow 312A in a broadcast, groupcast, or unicast mode, determines SLRB ID by mapping characteristics in QoS flow 312A to the rules in SLRB table 400 and selects the SLRB ID that is associated with the rule that fits the characteristics. As discussed above, the rules that map QoS flows 312 to SLRB IDs based on QoS characteristics are stored in SLRB table 400. Further, as discussed above, different SLRB IDs are associated with different radio bearers 316 that carry QoS flows 312.

At step 704, an SLRB ID is inserted into a header of the packet. For example, SLRB module 508 may insert the selected SLRB ID for QoS flow 312A into a header of packet 308 in QoS flow 312A at AS layer 306. In another example, SLRB module 508 may insert the SLRB ID into the SCI included in the header. Further, SLRB module 508 may insert the SLRB ID in the header because the receiving UE 206 may read the header or SCI without parsing the rest of packet 308. For illustration purposes, SLRB module 508 may map QoS flow 312A to SLRB ID 1.

At step 706, a QoS flow is mapped to a radio bearer. For example, at AS layer 306 SLRB module 508 may map QoS flow 312A to radio bearer 316A that is associated with SLRB ID 1. Notably, AS layer 306 may map other QoS flows 312, such as QoS flow 312B to radio bearer 316B. Unlike QoS flow 312A, QoS flow 312B may be associated with SLRB ID 2 and is mapped to a different corresponding radio bearer 316B.

At step 708, a radio bearer is mapped to an L2 link. For example, at AS layer 306 SLRB module 508 may map radio bearer 316A, along with other radio bearers, such as radio bearer 316B to L2 link 318A. Radio bearer 316B may include different QoS flows, such as QoS flow 312B, with different QoS and a different SLRB ID, such as SLRB ID 2. However, because radio bearers 316A and 316B include SLRB IDs, UE 206 that receives packets 308 in L2 link 318A may differentiate the QoS of packets 308 from different QoS flows 312A, 312B according to SLRB ID. Further, UE 206 may use the SLRB ID to process packets 308 from QoS flows 312A, 312B differently because different SLRB IDs map to different rules.

At step 710, the QoS flow in a radio bearer are transmitted using the L2 link. For example, radio bearers 316A and 316B are transmitted from UE 206c via L2 link to UEs 206d, 206f.

Figure 8:
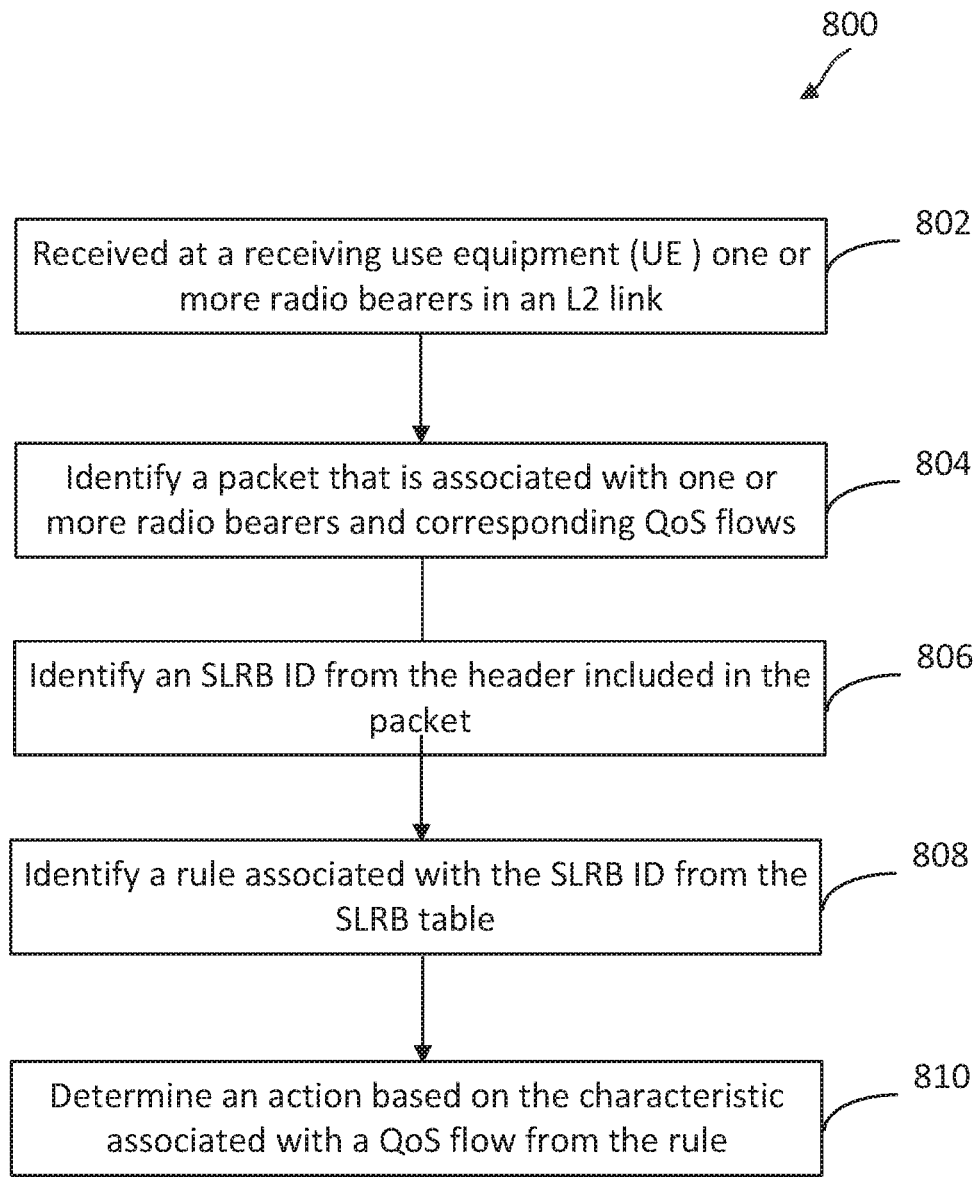
FIG. 8 is a flow diagram for identifying characteristics the QoS flow received over sidelink communication, according to embodiments of the present disclosure.

FIG. 8 is a flow diagram of a method 800 according to some aspects of the present disclosure. Steps of the method 800 can be executed by a computing device (e.g., a processor, processing circuit, and/or other suitable component) of a wireless communication device or other suitable means for performing the steps. For example, a wireless communication device, such as the UE 206, may utilize one or more components, such as the processor 502, the memory 504, SLRB module 508, the transceiver 510, the modem 512, and the one or more antennas 516, to execute the steps of method 1100. As illustrated, the method 700 includes a number of enumerated steps, but aspects of the method 1100 may include additional steps before, after, and in between the enumerated steps. In some aspects, one or more of the enumerated steps may be omitted or performed in a different order.

At step 802, one or more radio bearers in an L2 link is received. For example, receiving UEs 206d, 206f may receive L2 link 318A as part of a broadcast, groupcast or unicast transmission. As discussed above, L2 link 318A may include radio bearers 316A, 316B, where radio bearer 316A corresponds to packets 308 with SLRB ID 1 and radio bearer 316B corresponds to packets 308 with SLRB ID 2.

At step 804, a packet is identified. For example, at AS layer 306 the SLRB module 508 in UEs 206d, 206f may identify packet 308 in L2 link 318A. At this point, AS layer 306 may identify whether the packet 308 is from radio bearer 316A or 316B.

At step 806, an SLRB ID is identified. For example, SLRB module 508 in AS layer 306 may identify SLRB ID from a header in packet 308 or from SCI in the header. As discussed above, SLRB module 508 may identify the SLRB ID in packet 308 from the header only and without parsing the rest of packet 308. Specifically, SLRB module 508 may identify that packets 308 include either SLRB ID 1 or SLRB ID 2.

At step 808, a rule associated with the SLRB is identified. For example, SLRB module 508 may identify a rule in the SLRB table that is associated with SLRB ID. As discussed above, the rule may include characteristics of QoS flow 312A or QoS flow 312B. Specifically, if SLRB ID is set to 1, SLRB module 508 may use the SLRB table 400 to determine one or more rules that correspond to SLRB ID 1 and that may be used to process QoS flow 312A. Alternatively, if SLRB ID is set to 2, SLRB module 508 may use the SLRB table 400 to determine one or more rules that correspond to SLRB ID 2 that may be used to process QoS flow 312B as defined in the rule. As discussed above, UEs 206 may have SLRB table 400 with the same rules and the rules may be accessed using SLRB ID. In this way, QoS flows 312A, 312B that have different characteristics may be processed differently and according to different rules.

At step 810, an action is determined based on the rule. For example, UE 206d may use the rules associated with QoS flow 312A to determine an action that is specific to the characteristics of QoS flow 312A as defined in the rule. More specifically, UE 206d may determine an action that would generate a HARQ NACK if the range between UE 206c and 206d is within the range characteristics of QoS flow 312A that are specified in the rule. Otherwise, UE 206d may determine an action that does not generate HARQ NACK.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A user equipment (UE) for wireless communication, comprising:
 a processor configured to:
  determine a sidelink radio bearer identifier (SLRB ID) for a quality of service (QoS) flow from a plurality of rules that map to a plurality of SLRB IDs, wherein a rule in the plurality of rules corresponds to a characteristic of the QoS flow;
  insert the determined SLRB ID into control information included in a header of a packet of the QoS flow;
  identify a radio bearer using the SLRB ID, wherein the radio bearer carries the packet of the QoS flow;
  map the radio bearer to a layer 2 (L2) link; and
 a transceiver configured to:
  communicate the packet of the radio bearer in the L2 link to at least one other UE with at least one other packet from a different QoS flow that is included in at least one other radio bearer that has a different SLRB ID.

2. The UE of claim 1, wherein the UE is configured with the plurality of rules that map to the plurality of SLRB IDs that correspond to different characteristics of different QoS flows.

3. The UE of claim 1, wherein the characteristic is a range between the UE and the at least one other UE.

4. The UE of claim 1, wherein the transceiver is further configured to receive the plurality of rules from a base station using a base station signal or a dedicated broadcasting signaling.

5. The UE of claim 1, wherein the processor is further configured to store the plurality of rules in an SLRB table in a SIM card of the UE.

6. The UE of claim 1, wherein the transceiver is further configured to communicate over a vehicle-to-everything (V2X) communication connection.

7. The UE of claim 1, wherein the transceiver is further configured to communicate in a unicast transmission with another UE.

8. The UE of claim 1, wherein the transceiver is further configured to communicate in a groupcast transmission or a broadcast transmission in a V2X communication connection to the at least one other UE that is within a preconfigured range from the UE.

9. A user equipment (UE) for wireless communication, comprising:
 a transceiver configured to:
  receive, from a second UE, at least one radio bearer in a layer 2 (L2) link that is configured to carry packets from multiple radio bearers that correspond to quality of service (QoS) flows with different characteristics;

a processor configured to:
  identify a packet from the at least one radio bearer;
  identify a sidelink radio bearer identifier (SLRB ID) from control information included in a header in the packet;
  identify a rule from a plurality of rules that maps to the SLRB ID, wherein the rule includes at least one characteristic of a QoS flow associated with the packet; and
  determine an action based on the at least one characteristic in the rule.

10. The UE of claim 9, wherein the processor is further configured to:
  process the action which causes the transceiver to issue a retransmission request to the second UE.

11. The UE of claim 9, wherein the transceiver is further configured to receive the at least one radio bearer in the L2 link in a groupcast or broadcast transmission from the second UE within a preconfigured range from the UE.

12. The UE of claim 9, wherein the transceiver is further configured to receive the at least one radio bearer in the L2 link in a unicast transmission from the second UE.

13. The UE of claim 9, wherein the UE is pre-configured with the plurality of rules or the transceiver is further configured to receive the plurality of rules from a base station in a base station broadcast signal or through dedicated signaling.

14. The UE of claim 9, wherein the at least one characteristic is a range between the UE and the second UE.

15. The UE of claim 9, wherein the UE and the second UE are pre-configured with the plurality of rules.

16. The UE of claim 9, wherein the processor is further configured to store the plurality of rules in an SLRB table in a SIM card of the first UE.

17. A method of wireless communication at a first user equipment (UE), comprising:
  determining, at the first UE, a sidelink radio bearer identifier (SLRB ID) for a quality of service (QoS) flow from a plurality of rules that map to a plurality of SLRB IDs;
  inserting the determined SLRB ID into a control resource block included in a header of a packet of the QoS flow;
  identifying a radio bearer using the SLRB ID, wherein the radio bearer carries the packet of the QoS flow;
  maping the radio bearer to a layer 2 (L2) link; and
  communicating the packet of the radio bearer in the L2 link to at least one second UE with at least one other packet from at least one other radio bearer that has a different SLRB ID that corresponds to a different QoS flow.

18. The method of claim 17, wherein the first UE and the at least one second UE are pre-configured with the plurality of rules that map to the plurality of SLRB IDs based on different characteristics of the QoS flow.

19. The method of claim 17, wherein the first UE and the at least one second UE receive the plurality of rules from a base station using a base station signal or dedicated broadcast signaling.

20. The method of claim 17, wherein a rule in the plurality of rules maps at least one characteristic of the QoS flow.

21. The method of claim 17, wherein the communicating is a unicast, broadcast, groupcast transmission in a V2X communication connection to the at least one second UE that is within a preconfigured range from the first UE.

22. A method of wireless communication at a first user equipment (UE), comprising:
  receiving, at the fist UE from a second UE, at least one radio bearer in an L2 link that is configured to carry packets from multiple radio bearers that correspond to quality of service (QoS) flows having different characteristics;
  identifying a packet from the at least one radio bearer;
  identifying a sidelink radio bearer identifier (SLRB ID) from a control resource block included in a header in the packet;
  identifying a rule from a plurality of rules that maps to the SLRB ID, wherein the rule includes at least one characteristic of a QoS flow associated with the packet; and
  determining an action at the first UE based on the at least one characteristic in the rule.

23. The method of claim 22, further comprising:
  processing the action, wherein the action causes the first UE to issue a retransmission request to the second UE.

24. The method of claim 22, wherein the receiving using the at least one radio bearer in the L2 link is a groupcast transmission, broadcast transmission, or a unicast transmission from the second UE.

25. The method of claim 22, wherein the first UE and the second UE are pre-configured with the plurality of rules.

26. The method of claim 22, wherein the first UE and the second UE receive the plurality of rules from a base station using a base station broadcast signal or using dedicated signaling.

27. The method of claim 22, storing the plurality of rules in an SLRB table in a SIM card of the first UE.

28. The UE of claim 1, wherein the plurality of rules that map to the plurality of SLRB IDs include a default rule.

29. The UE of claim 9, wherein the processor is further configured to:
  parse the control information in the header of the packet without parsing the entire packet.

30. The UE of claim 9, wherein to identify the rule, the processor is further configured to assign a default rule when the plurality of rules do not map to the SLRB ID.

31. The method of claim 22, further comprising:
  parsing the control resource block in the header of the packet without parsing the entire packet.

* * * * *